(No Model.)

J. SHERMAN.
NUT LOCK.

No. 269,474. Patented Dec. 19, 1882.

Witness.
E. W. Laird.
J. W. Tibbitts

Inventor.
John Sherman
By Geo. W. Gibbins atty.

UNITED STATES PATENT OFFICE.

JOHN SHERMAN, OF CLEVELAND, OHIO.

NUT-LOCK.

SPECIFICATION forming part of Letters Patent No. 269,474, dated December 19, 1882.

Application filed May 25, 1882. (No model.)

*To all whom it may concern:*

Be it known that I, JOHN SHERMAN, of Cleveland, in the county of Cuyahoga and State of Ohio, have invented a new and useful Improvement in Nut-Locks, of which the following is a specification.

The nature and operation of this invention will fully appear from the subjoined description, when considered in connection with the accompanying drawings, in which—

Figure 1:
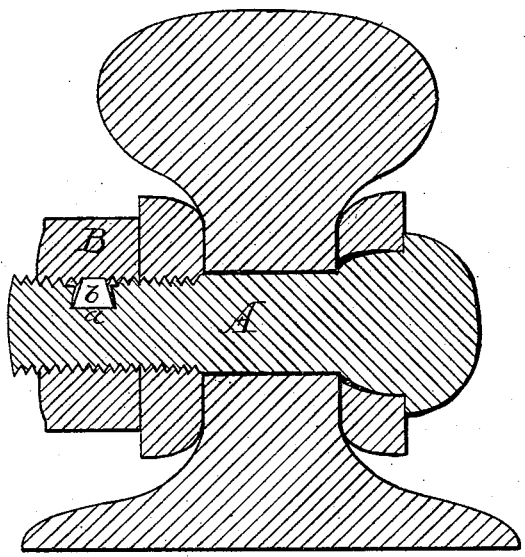
Figure 2:
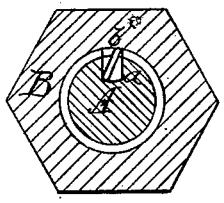

Figure 1 is a longitudinal section of a bolt and nut having my improved lock, as seen in place in a rail. Fig. 2 is a transverse section of the bolt and nut, showing locking device.

A is a bolt of the kind used in coupling railway-rails. The nut B is of common and well-known construction.

The object of my invention is to prevent the loosening of said nut by jarring in a simple and economical manner, and which will allow the nut to be removed, if desired, by force without injury to nut or bolt. This I accomplish in the following manner:

In the side of the bolt is made a recess, $a$, which is made when the bolt-blank is gripped in the heading-machine, one of the gripping-dies being provided with a projection which punches said recess. The upper ends of said recess are elongated to the depth of the thread for a short distance, thus leaving a short shoulder, the purpose of which will shortly appear. In the said recess is placed a small key, $b$, cut from thin sheet-steel, having tapering sides, the longest side being the bottom resting on the bottom of the recess. The key is secured loosely in the recess by bending over the corners of said shoulders by means of a hand-punch. This will prevent the key from dropping out and becoming lost. The recess is made about three times as broad as the thickness of the key, for the purpose of allowing the key to tilt sidewise. The thread is cut upon the bolt after the recess is punched and the key is inserted after.

The operation of this device is as follows: The nut being put on, when it reaches the key tilts it over. Then when the nut is screwed up tight the edge of the key catches in the thread in the nut if it be turned back or attempts to turn back. The key therefore prevents the nut becoming loose from any common jarring motion.

Should it be necessary at any time to remove the nut, it could be done by using a wrench and applying sufficient force. Then the key would be tilted over in the opposite direction. Then the nut would come off in the ordinary manner. The bottom of the recess, being curved, allows the key to slide on the bottom in tilting.

Having described my invention, I claim—

The combination, with the bolt A, having the shouldered recess $a$, of the taper-sided key $b$, secured in said recess and operating to lock the nut B, substantially as and for the purpose specified.

JOHN SHERMAN.

Witnesses:
 GEO. W. TIBBITTS,
 EDGAR F. BESSE.